April 23, 1968    H. HOEL ETAL    3,379,935
ELECTRICAL RELAYS

Filed March 19, 1965    2 Sheets-Sheet 1

United States Patent Office 3,379,935
Patented Apr. 23, 1968

3,379,935
ELECTRICAL RELAYS
Hans Hoel, Oslo, Norway, and Eric Paddison, Stafford, England, assignors to The English Electric Company Limited, London, England, a British company
Filed Mar. 19, 1965, Ser. No. 441,242
Claims priority, application Great Britain, Mar. 25, 1964, 12,593/64
5 Claims. (Cl. 317—36)

ABSTRACT OF THE DISCLOSURE

This invention relates to a protective relay for an electrical system and comprises two rectifying networks for receiving two different alternating signals dependent on line conditions and producing unsmoothed unidirectional signals therefrom. These unsmoothed signals are combined and applied to an integrator which develops an output dependent on the difference between the instantaneous amplitudes of the alternating signals only when this difference signal has a predetermined sense for a duration which exceeds a predetermined proportion of the period of this signal.

More particularly, the invention consists in a protective relay for an electrical system comprising a first full-wave rectifying network for receiving a first alternating input signal at its A.C. terminals dependent on electrical conditions in the system and for producing in response thereto a first unsmoothed unidirectional signal at its D.C. terminals having an amplitude dependent on the first input signal, a second full-wave rectifying network for receiving a second alternating input signal at its A.C. terminals dependent on said electrical conditions and for producing in response thereto a second unsmoothed unidirectional signal at its D.C. terminals having an amplitude dependent on the second input signal, the first and second networks having their D.C. terminals connected together in series-aiding relationship, and an integrator commonly connected across the D.C. terminals of both networks whereby to receive an alternating difference signal dependent on the difference between the instantaneous amplitudes of the first and second unidirectional signals and to produce an output therefrom when said difference signal has a predetermined sense for a duration which exceeds a predetermined proportion of the period of this signal.

The integrator is preferably responsive to the difference signal over successive periods thereof whereby to produce said output upon a summation of said difference signals attaining a preset level which is indicative of the duration of said sense of the difference signal having exceeded the said predetermined proportion of the period of this signal.

This predetermined proportion may be so chosen that the relay exhibits circular, lemon-shaped or apple-shaped operating characteristics, but by providing more than two full-wave rectifying networks with their D.C. terminals connected together different operating characteristics may readily be derived.

In order that the invention may be fully understood, one embodiment thereof operable as, e.g., a distance relay, will now be described with reference to the accompanying drawings, in which.

Figure 1:
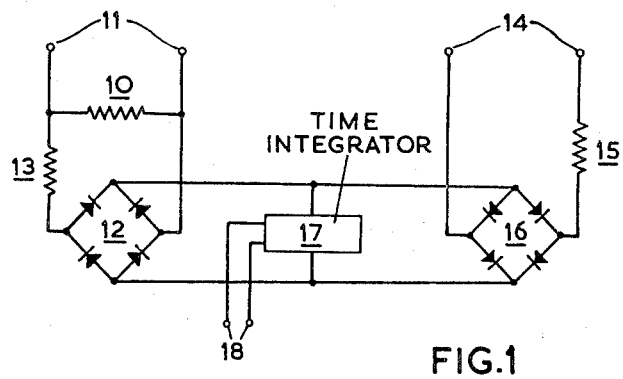
FIGURE 1 is a circuit diagram of the relay.
Figure 2:
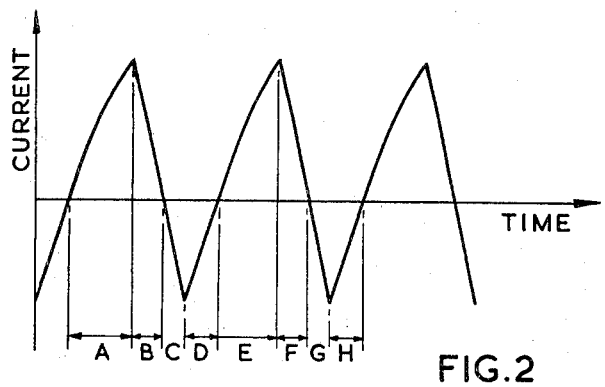
FIGURES 2A and 2B illustrate two relationships between unidirectional signals from the rectifying networks, and the difference signal derived therefrom.

Referring now to FIGURE 1, a resistor 10, which is connected across input terminals 11 for receiving an alternating current input signal, develops an alternating voltage signal which is applied to a full-wave rectifying network 12 through a stabilising resistor 13. An alternating voltage input signal is applied at input terminals 14 and fed through a stabilising resistor 15 to a full-wave rectifying network 16. The direct current output signals of the rectifying networks 12 and 16 are connected in series addition to form an electrical loop and a time integrator 17 is connected across this loop so as to allow a current equal to the instantaneous difference of said current output signals to flow through the time integrator. The time integrator has output terminals 18.

Figure 2A:
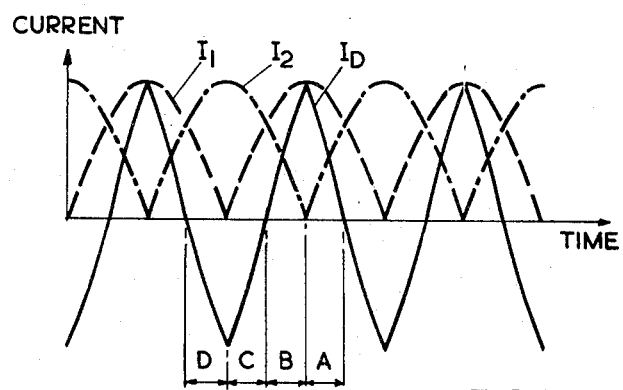

In FIGURE 2A there is shown the rectified current $I_1$ from the network 12 and the rectified current $I_2$ from the network 16; these currents are of the same amplitude and frequency and are phase displaced from one another by an angle $\theta=90°$ and accordingly the difference current $I_D=I_1-I_2$ is symmetrical, angles $(A+B)$, the positive half cycle, being equal to angles $(C+D)$, the negative half cycles. With these input signals, the operating characteristic will be a circle whose centre is at the origin of the impedance diagram, as indeed will any characteristic derived from such input signals of the same amplitude irrespective of their phase displacement.

Figure 3:
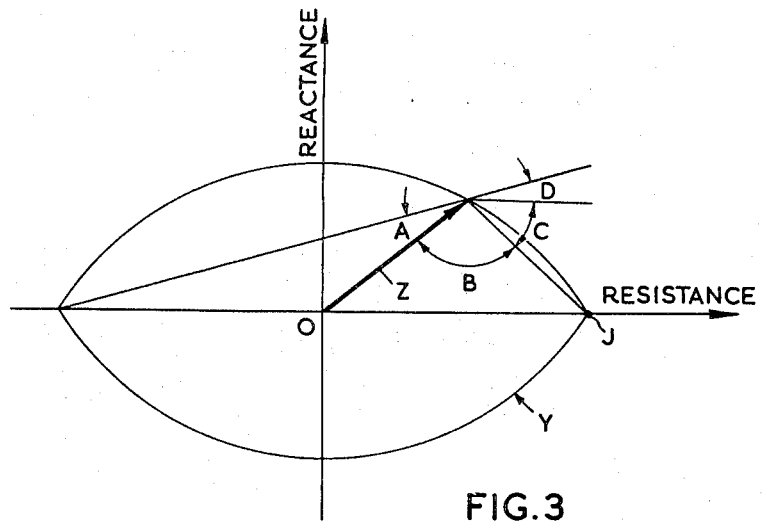
FIGURE 3 illustrates a lemon-shaped operating characteristic derived from the relationship shown in FIGURE 2B.
Figure 2B:
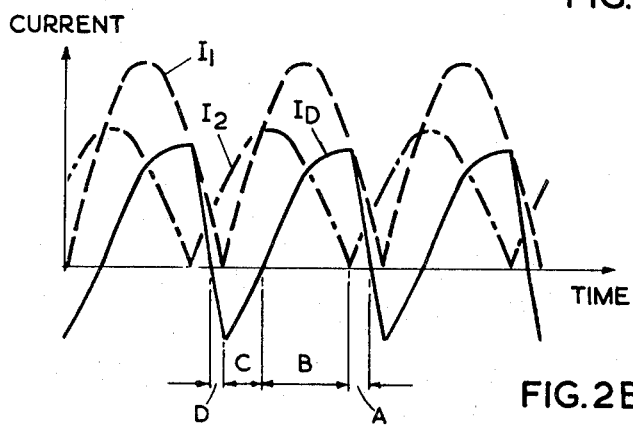

In FIGURE 2B there is shown the case for which the amplitude of $I_1$ is greater than $I_2$ and this produces a lemon-shaped characteristic, that is, a characteristic bounded by a pair of equal arcs each less than half the circumference of a circle. Such a characteristic Y is shown in FIGURE 3 for the particular conditions illustrated in FIGURE 2B, that is, with the phase difference $\theta=40°$ and the angles $(A+B)$ approximately twice as large as the angles $(C+D)$. Similarly, for the case in which $I_2$ is larger than $I_1$ angles $(A+B)$ will be smaller than angles $(C+D)$ and the characteristics produced will be apple-shaped, that is, a characteristic bounded by a pair of equal arcs each greater than half the circumference of a circle.

Thus, in dependence on the particular operating characteristic chosen for the relay as determined by the input circuits thereto, whenever the effective impedance Z of the protected system falls within the boundary of this relay characteristic an output signal will be produced at the terminals 18 of the integrator after a period dependent on the time taken for the integrated signal, which is a summation of successive cycles of the difference current, to reach a preset level, although of course this level could be attained during the initial cycle, depending on the position of the fault.

By performing the integration over successive cycles of the difference current in this way any errors due to D.C. components of the protected system being present tend to be cancelled out since, whereas a comparison of $(A+B)$ and $(C+D)$ over only one cycle of the difference current represents only a half cycle at the fundamental frequency of the system a comparison of $(A+B)$ and $(C+D)$ in two successive cycles embraces a full cycle of the fundamental.

If a circular operating characteristic is chosen for the relay then the boundary of operation is realised by the difference current having the aforesaid predetermined sense for a period equivalent to 180 electrical degrees, if the characteristic is to be lemon-shaped then the boundary of operation is realised by the difference current having that sense for any chosen period between 180 and 360 degrees and if the characteristic is to be apple-shaped then the boundary of operation is realised by the difference current having that sense for any chosen period between 0 and 180 degrees. If reference is made to the fundamental system frequency, the values of electrical degrees within the periods stated will of course be halved.

It is to be understood that various modifications may be made to the arrangement described without departing from the scope of this invention. For example, the resistor 10 may be replaced by a selected impedance to extend the operating characteristic from the origin according to the magnitude of that impedance in a direction dependent on the relationship of the resistive and reactive components of that impedance.

Further, the operating characteristic of the relay may be displaced from the origin of the impedance diagram by having a transformer means or any other suitable means for cross-linking the said input signals so as to render at least one of the input signals to the relay dependent on both a current and a voltage simultaneously in the electrical system to be protected by the relay.

What we claim as our invention and desire to secure by Letters Patent is:

1. A protective relay for an electrical system comprising
 a first full-wave rectifying network for receiving a first alternating input signal at its A.C. terminals dependent on electrical conditions in the system and for producing in response thereto a first unsmoothed unidirectional signal at its D.C. terminals having an amplitude dependent on the first input signal,
 a second full-wave rectifying network for receiving a second alternating input signal at its A.C. terminals dependent on said electrical conditions and for producing in response thereto a second unsmoothed unidirectional signal at its D.C. terminals having an amplitude dependent on the second input signal,
 circuit means connecting the D.C. terminals of the first and second networks together in series-aiding relationship, and
 an integrator commonly connected across the D.C. terminals of both networks whereby to receive an alternating difference signal dependent on the difference between the instantaneous amplitudes of the first and second unidirectional signals and to produce an output therefrom when said difference signal has a predetermined sense for a duration which exceeds a predetermined proportion of the period of this signal.

2. A protective relay according to claim 1, wherein the integrator is responsive to the difference signal over successive periods thereof whereby to produce said output upon a summation of said difference signals attaining a preset level which is indicative of the duration of said sense of the difference signal having exceeded the said predetermined proportion of the period of this signal.

3. A protective relay according to claim 1, wherein the predetermined proportion of the period of the difference signal is one half, whereby said relay exhibits a circular operating characteristic.

4. A protective relay according to claim 1, wherein the predetermined proportion of the period of the difference signal is more than one half, whereby said relay exhibits a lemon-shaped operating characteristic.

5. A protective relay according to claim 1, wherein the predetermined proportion of the period of the difference signal is less than one half, whereby said relay exhibits an apple-shaped operating characteristic.

References Cited

UNITED STATES PATENTS 3,131,329   4/1964   Braun _____ 317—27

MILTON O. HIRSHFIELD, *Primary Examiner.*

J. D. TRAMMELL, *Assistant Examiner.*